US012610269B2

(12) United States Patent
Tooher et al.

(10) Patent No.: US 12,610,269 B2
(45) Date of Patent: Apr. 21, 2026

(54) QUALITY OF SERVICE FEATURES ASSOCIATED WITH SUPPORTING VERTICALS IN WIRELESS SYSTEMS

(71) Applicant: InterDigital Patent Holdings, Inc., Wilmington, DE (US)

(72) Inventors: J. Patrick Tooher, Montreal (CA); Faris Alfarhan, Montreal (CA); Paul Marinier, Brossard (CA); Dylan Watts, Montreal (CA); Ghyslain Pelletier, Montreal (CA); Yugeswar Deenoo Narayanan Thangaraj, Chalfont, PA (US); Jaya Rao, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 544 days.

(21) Appl. No.: 17/924,894

(22) PCT Filed: May 19, 2021

(86) PCT No.: PCT/US2021/033117
§ 371 (c)(1),
(2) Date: Nov. 11, 2022

(87) PCT Pub. No.: WO2021/236744
PCT Pub. Date: Nov. 25, 2021

(65) Prior Publication Data
US 2023/0189055 A1 Jun. 15, 2023

Related U.S. Application Data

(60) Provisional application No. 63/026,906, filed on May 19, 2020, provisional application No. 63/060,823, (Continued)

(51) Int. Cl.
*H04W 28/02* (2009.01)

(52) U.S. Cl.
CPC ... *H04W 28/0263* (2013.01); *H04W 28/0268* (2013.01)

(58) Field of Classification Search
CPC ...................... H04W 28/0268; H04W 28/0263
See application file for complete search history.

(56) References Cited

U.S. PATENT DOCUMENTS

2007/0206635 A1* 9/2007 Pozhenko ............... H04L 47/11
370/473
2015/0003435 A1 1/2015 Horn et al.
(Continued)

FOREIGN PATENT DOCUMENTS

WO 2018145103 A1 8/2018
WO 2019201747 A1 10/2019

OTHER PUBLICATIONS

R2-1910104 , "Details of Selective Duplication Procedure", 3GPP TSG-RAN WG2 Meeting #107; Lenovo, Motorola Mobility; Prague, Czech Republic, Aug. 26-30, 2019, 4 pages.

*Primary Examiner* — Huy D Vu
*Assistant Examiner* — Bao G Nguyen
(74) *Attorney, Agent, or Firm* — Flaster Greenberg, P.C.

(57) ABSTRACT

Systems and methods are described for QoS procedures supporting verticals in wireless systems. Data flows may combine or remap for QoS remapping conditions or state transitions. Data flow remapping may be indicated by triggering a BSR/SR or by multiplexing in the PDU. A non-default set of LCP parameters may be applied for an LCH after a QoS state transition, QoS remapping trigger, or LCP parameter suspension/override. A WTRU may operate according to a QoS adaptation state corresponding to a set of parameter values for a group of data flows, radio bearers, and/or logical channels. A WTRU may transition between QoS adaptation states. An RRC configuration and/or a MAC function may adapt to changing QoS requirement(s). QoS (Continued)

requirement(s) may adapt to changing MAC functions. QoS may be associated with survival time(s). QoS may adapt to higher layer indications. Packet forwarding may adapt to QFI in DL for QoS state changes.

15 Claims, 6 Drawing Sheets

Related U.S. Application Data filed on Aug. 4, 2020, provisional application No. 63/167,932, filed on Mar. 30, 2021.

(56) References Cited

U.S. PATENT DOCUMENTS

| | | | |
|---|---|---|---|
| 2019/0229843 A1* | 7/2019 | Yoshimoto | H04L 5/0055 |
| 2019/0281491 A1* | 9/2019 | Cheng | H04W 4/30 |
| 2020/0059404 A1* | 2/2020 | Liu | H04W 76/27 |
| 2021/0126745 A1* | 4/2021 | Kadiri | H04L 1/1832 |
| 2021/0289391 A1* | 9/2021 | Paladugu | H04W 88/04 |
| 2021/0400706 A1* | 12/2021 | Aiba | H04L 1/0061 |
| 2022/0174687 A1* | 6/2022 | Kuo | H04W 72/23 |
| 2022/0295337 A1* | 9/2022 | Kim | H04W 76/14 |

* cited by examiner

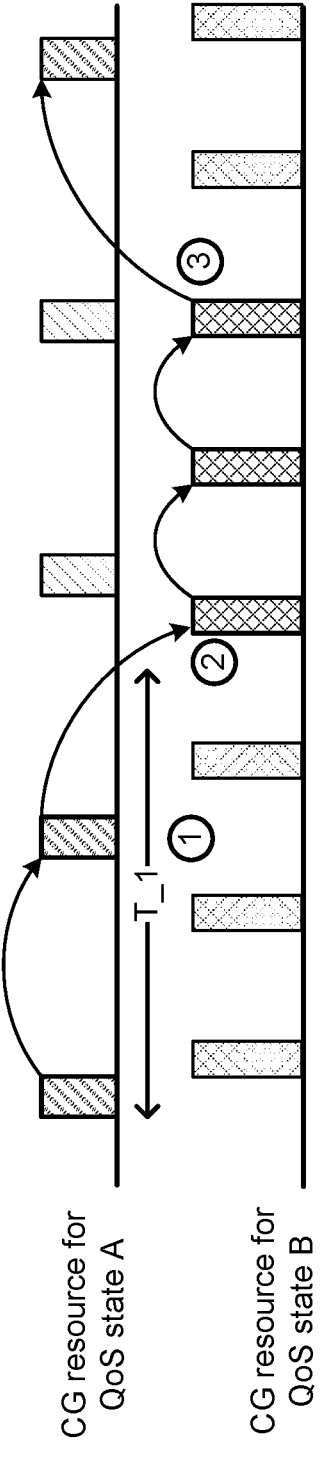

CG resource for QoS state A

CG resource for QoS state B

T_1

① WTRU starts T_1 timer (determined as a function of survival time) at first transmission. WTRU may restart T_1 if it receives ACK that at least one TB was received successfully.

② If T_1 elapses, WTRU changes QoS state (includes: changing CG configuration, PDCP duplication, LCP configuration, RLM configuration, ....) for subsequent retransmission or new transmission associated to the flow.

③ WTRU receives ACK for at least one transmission. WTRU returns to QoS state A.

QoS State
- Parameters of MAC LCH (e.g., priority, LCP restrictions, timer config., CG config.)
- Parameters of RLC config.
- Parameters of PDCP config (e.g., PDCP duplication)
- Parameters of SDAP config (e.g., set of mapped QoS flows)

FIG. 2A

QUALITY OF SERVICE FEATURES ASSOCIATED WITH SUPPORTING VERTICALS IN WIRELESS SYSTEMS

CROSS-REFERENCE TO RELATED APPLICATIONS

This application is the 371 National Stage of International Application No. PCT/US2021/033117, filed May 19, 2021, which claims the benefit of Provisional U.S. Patent Application No. 63/026,906, filed May 19, 2020, Provisional U.S. Patent Application No. 63/060,823, filed Aug. 4, 2020, and Provisional U.S. Patent Application No. 63/167,932, filed Mar. 30, 2021, the disclosure of which is incorporated herein by reference in its entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein for QoS features to support verticals in wireless systems. A WTRU may combine or remap data flows, for example, upon triggering one or more QoS remapping conditions or upon transitioning between QoS states (e.g., by applying a configured non-default mapping rule). A WTRU may indicate a data flow remapping, for example, by triggering a BSR/SR (e.g., a new BSR/SR) or by multiplexing an indication in the PDU. A WTRU may apply a non-default set of LCP parameters for an LCH, for example, after transitioning into a QoS state, triggering a QoS remapping condition, or receiving an LCP parameter suspension/override indication from a base station (e.g., gNB). A WTRU may be configured to operate according to at least one QoS adaptation state. A QoS adaptation state may correspond to one or more (e.g., a set of) parameter values for a group of data flows, radio bearers, and/or logical channels. A WTRU may transition between QoS adaptation states. An RRC configuration may be changed, for example, due to a change in a QoS requirement. A MAC function may be adapted, for example, due to a change in a QoS requirement. QoS requirements may be adapted, for example, due to changes in MAC functions. QoS may be associated with a survival time. QoS may be adapted, for example, based on a higher layer indication (e.g., sensor data). Packet forwarding treatment may be based on a QFI in DL, for example, upon detecting a change in a QoS state (e.g., at a WTRU). A survival time timer/counter may increase or decrease based on (e.g., as a function of) a channel occupancy. A WTRU may determine, indicate, and/or receive an indication of a burst spread, for example, based on one or more triggers. A QoS adaptation state may be changed, for example, when a burst spread begins/ends. Failure detection may be provided for a set of transmissions. Timer maintenance for a survival time may be provided. Multiple timers and criteria may be used to adapt between a low robust RRC configuration and a highly robust RRC configuration and back.

BRIEF DESCRIPTION OF THE DRAWINGS

FIG. 2A is a diagram illustrating an example WTRU transitioning between QoS states

DETAILED DESCRIPTION

Figure 1A:
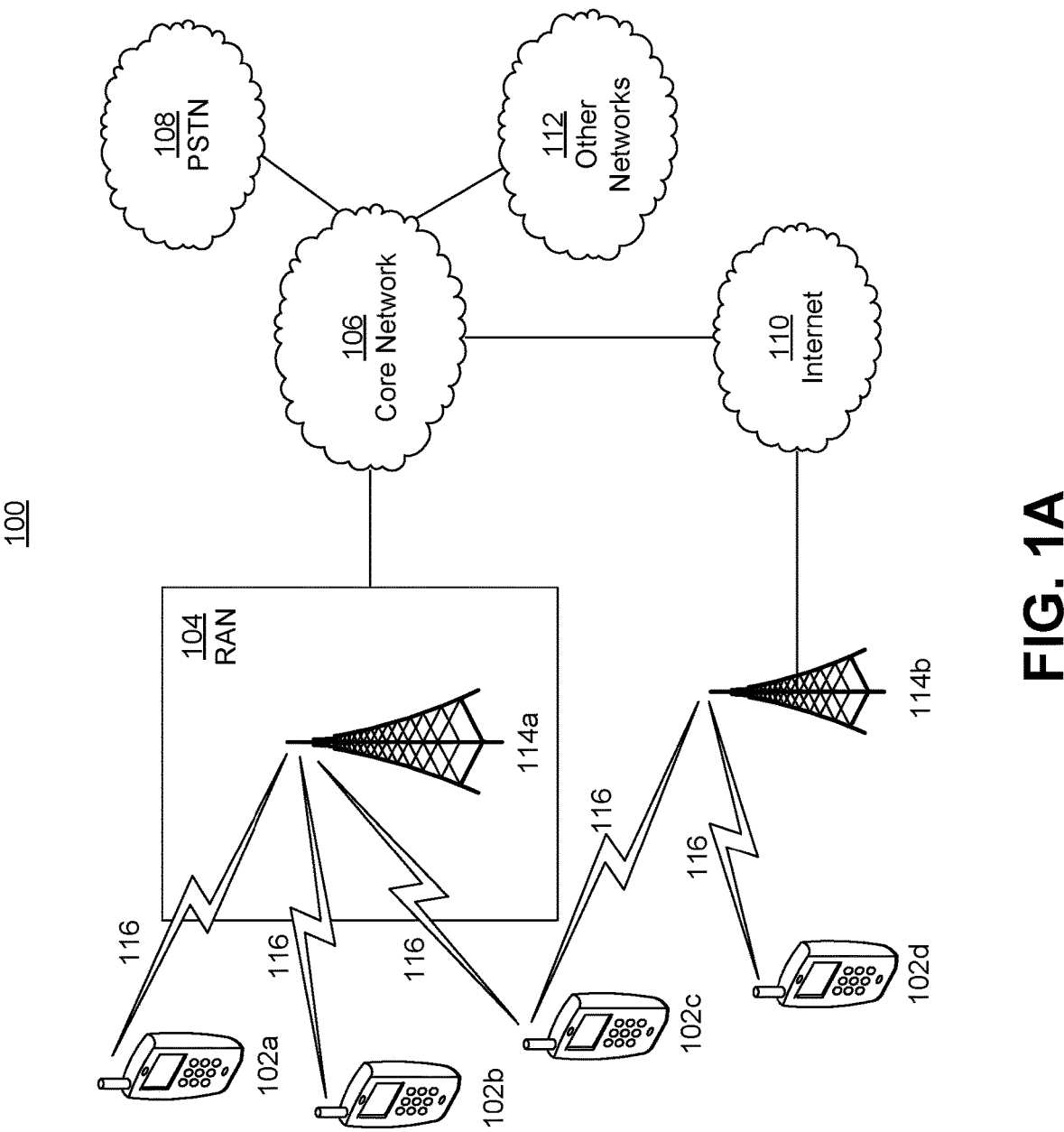
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
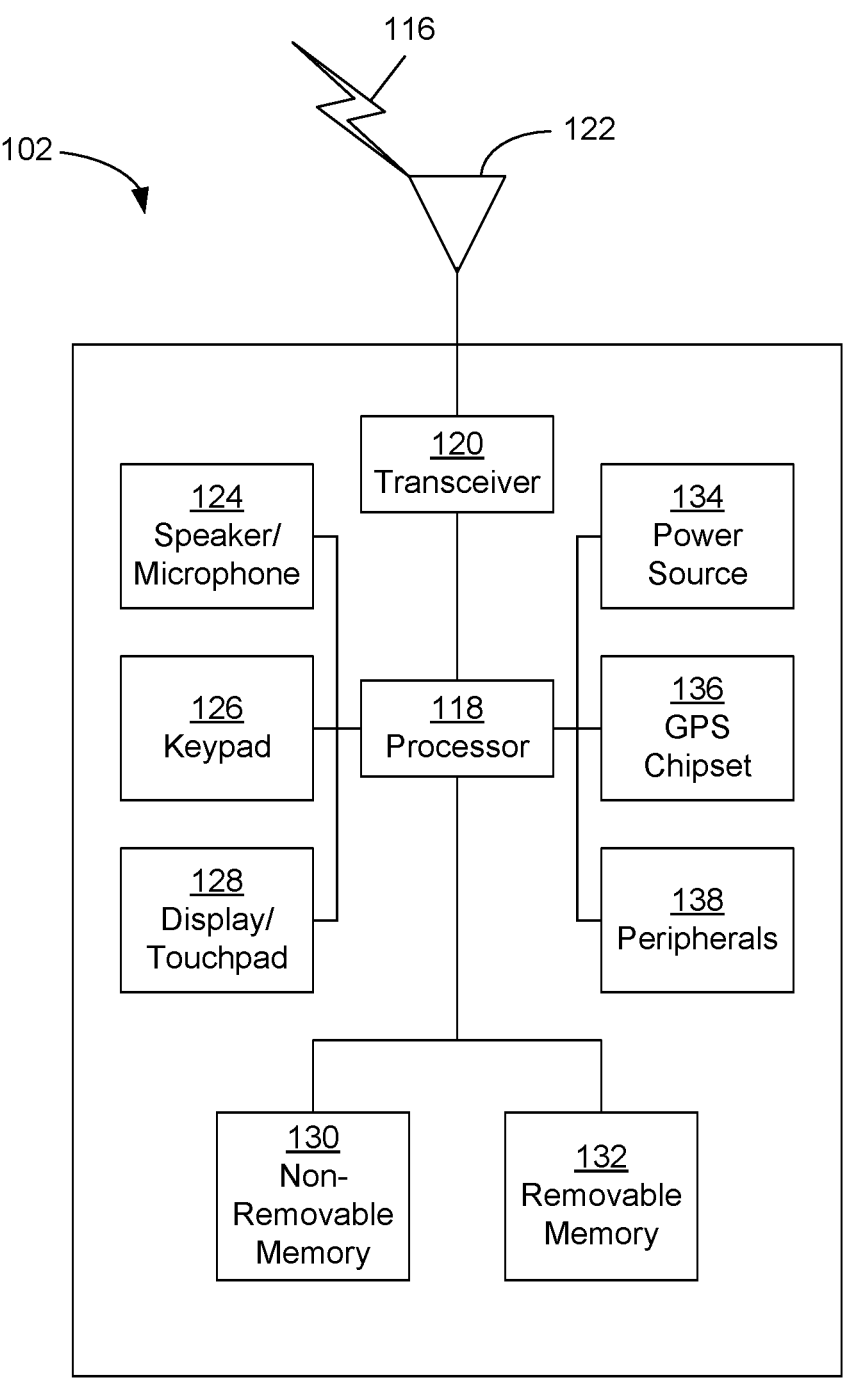
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
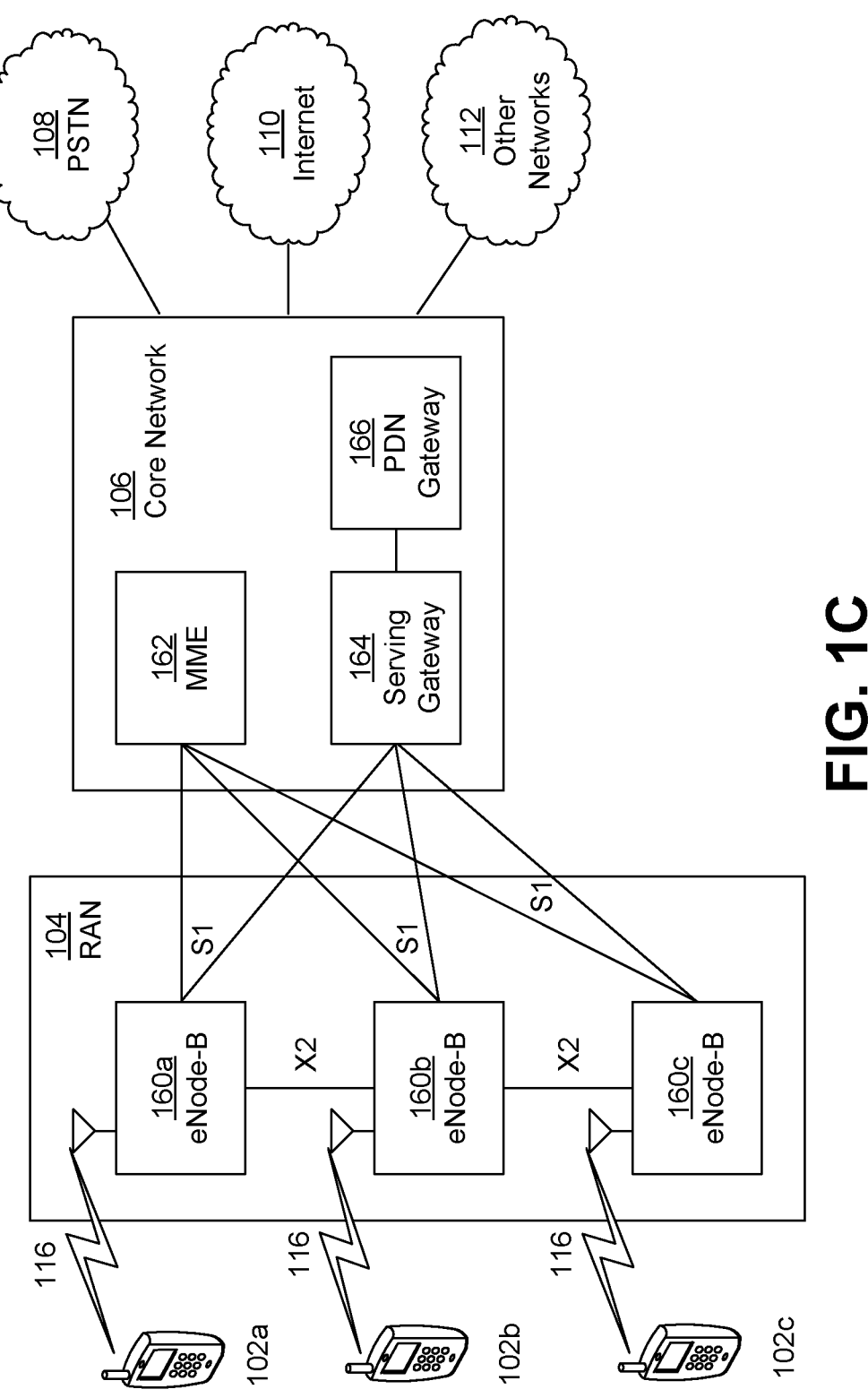
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
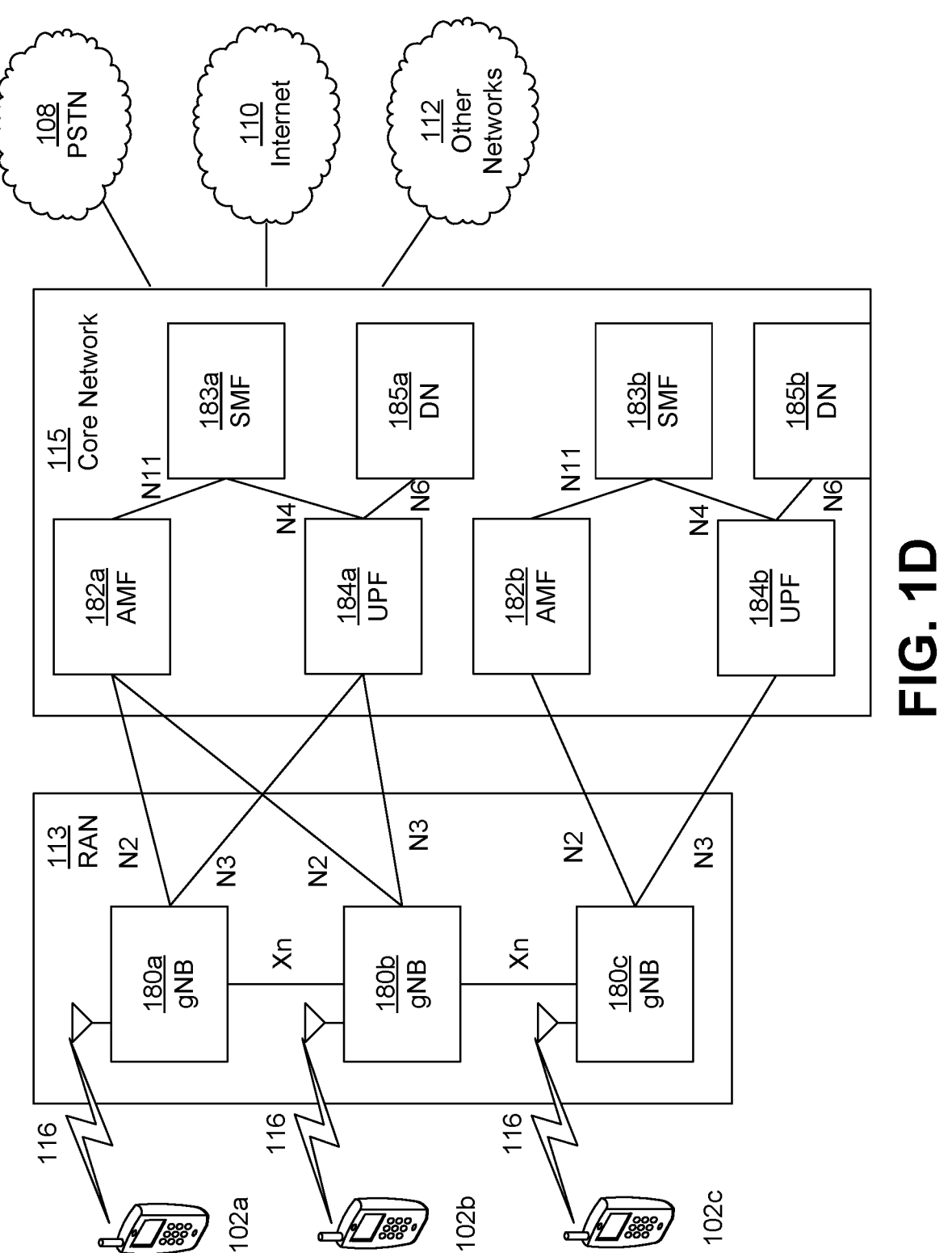
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AM F 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

WTRUs may be served (e.g., in a new radio (NR) mobile network) with one or more services that may have varying latency and reliability requirements, e.g., ultra-reliable and low latency communications (URLLC) and enhanced mobile broadband (eMBB) services. Transmissions may be received with a higher level of latency and reliability, for example, to support operation with different types of service, such as URLLC and eMBB.

Transmissions, such as NR transmissions, may be supported (e.g., sent/received) with a flexible transmission duration within a slot (e.g., which may not have been available in LTE). Semi-static resources for data transmission (e.g., NR transmissions) may be supported. Resources for data transmission (e.g., uplink and downlink data transmission) may be semi-static. For example (e.g., for a configured grant (CG) type-1 for uplink transmissions), a network may semi-statically configure an uplink grant that a WTRU may (e.g., autonomously) use (e.g., without an L1 indication/activation). One or more other semi-static configurations (e.g., a configured grant type-2) may consider L1 indication/activation. Downlink (DL) semi-persistent scheduling (SPS) of resources and/or DL configured grants (CGs) may be supported. For example, a WTRU may receive DL data on active DL CGs without scheduling for a DL transport block (TB) (e.g., each DL TB).

UL and DL services may have different quality of service (QoS) requirements (e.g., including traffic of varying latency and reliability requirements). Time-sensitive communications and networking (e.g., including deterministic and non-deterministic time sensitive networking (TSN) traffic patterns and flows may be supported (e.g., using licensed and/or unlicensed spectrum).

Data packets may originate in the application layer from an application. The non-access stratum (NAS) layer may assign QoS requirements and mapping rules. The NAS may map data/internet protocol (IP) flows carrying data packets to a QoS flow and may configure a QoS flow ID (QFI) for a QoS flow (e.g., each QoS flow). Data packets (e.g., all data packets) within the same QoS flow may have the same QFI. The access stratum (AS) layer may map a QoS flow to radio layer resources. A service data adaptation layer (SDAP) entity within a WTRU may map a QoS flow to a data radio bearer (DRB). Multiple data packets (e.g. all data packets) mapped to the same DRB may have the same transmission treatment in the AS (e.g., from a radio interface perspective). An SDAP QoS flow to DRB mapping rules may be config- ured semi-statically in radio resource control (RRC). A WTRU-SDAP may map a service data unit (SDU) to a DRB, for example, according to configured rules or according to a default DRB (e.g., if no rules are configured). RRC may configure a DRB (e.g., each DRB) with one or more logical channels (LCHs). A logical channel prioritization (LCP) function in a WTRU-medium access control (MAC) may allocate uplink radio resources among LCHs with buffered data in the WTRU, for example, based on configured QoS related LCP parameters (e.g., LCH priority, LCH prioritized bit rate (PBR), bucket size duration (BSD), and LCP map- ping restrictions, which may be configured per LCH).

Virtual reality (VR) may provide a rendered version of a delivered visual and/or audio scene. A rendering may mimic the visual and audio sensory stimuli of the real world (e.g., as naturally as possible) to an observer or user as they move within the limits defined by an application. Augmented reality (AR) may provide a user with additional information or artificially generated items or content overlaid upon an environment (e.g., a current environment of the user). Mixed reality (MR) may provide an advanced form of AR. One or more virtual elements may be inserted into a scene (e.g., physical scene), for example, to provide the illusion that the elements are part of the scene (e.g., real scene). The term "eXtended Reality" (XR) may be an umbrella term for different types of realities, e.g., including Virtual Reality (VR), Augmented Reality (AR), Mixed Reality (MR), and realities that may be interpolated among them. XR may include real-and-virtual combined environments and human-machine interactions that may be generated by com- puter technology and wearables. The term "immersion" (e.g., in the context of XR services) may refer to a sense of being surrounded by a virtual environment, which may provide a feeling of being physically and spatially located in a virtual environment.

Channel state information (CSI) may include, for example, at least one of the following: a channel quality index (CQI), a rank indicator (RI), a precoding matrix index (PMI), an L1 channel measurement (e.g., reference signal received power (RSRP), such as L1-RSRP, or signal to interference and noise ratio (SINR)), a channel state indi- cator reference signal (CSI-RS) resource indicator (CRI), a synchronization signal (SS)/physical broadcasting channel (PBCH) block resource indicator (SSBRI), a layer indicator (LI), or any other measurement quantity measured by the WTRU from the configured CSI-RS or SS/PBCH block.

Uplink control information (UCI) may include, for example, one or more of the following: a CSI, hybrid automatic repeat request (HARQ) feedback for one or more HARQ processes, a scheduling request (SR), a link recovery request (LRR), CG-UCI and/or other control information bits that may be transmitted on the physical uplink control channel (PUCCH) or physical uplink shared channel (PUCCH).

Channel conditions may include one or more conditions that relate to the state of a radio/channel, which may be determined by a WTRU, for example, from (e.g., based on)

one or more of the following: a WTRU measurement (e.g., a L1/SINR/RSRP, a CQI/modulation and coding scheme (MCS), a channel occupancy, a received signal strength indicator (RSSI), a power headroom, an exposure head- room), L3/mobility-based measurements (e.g., a RSRP, a reference signal received quality (RSRQ)), a radio link monitoring (RLM) state, and/or channel availability in an unlicensed spectrum (e.g., whether the channel may be occupied based on determination of a listen-before-talk (LBT) procedure or whether the channel may be deemed to have experienced a consistent LBT failure).

A property of scheduling information (e.g., an uplink grant or a downlink assignment) may include, for example, at least one of the following: a frequency allocation; an aspect of time allocation, such as a duration; a priority; a modulation and coding scheme; a transport block size; a number of spatial layers; a number of transport blocks to be carried; a transmission configuration indicator (TCI) state or a sounding reference signal (SRS) resource index (SRI); a number of repetitions; and/or an indication of a grant configuration (e.g., configured grant type 1, type 2 or a dynamic grant).

An indication (e.g., by DCI) may include, for example, at least one of the following: an indication (e.g., explicit indication) by a DCI field or by a radio network temporary identifier (RNTI) that may be used, for example, to mask a cyclic redundancy check (CRC) of a physical downlink control channel (PDCCH); and/or an indication (e.g., implicit indication) by a property, such as, for example, a DCI format, a DCI size, a control resource set (CORESET) or a search space, an aggregation level, or an identity of a (e.g., first) control channel resource (e.g., index of a (first) control channel element (CCE)) for a DCI. A mapping between a property and a value may be signaled, for example, via RRC or MAC.

Example(s) described herein may provide examples based on transmissions and delivery of XR services. Examples are not limited to example scenarios described herein. Examples may be applicable to any type of transmissions and/or services, including but not limited to cloud gaming, Internet of things (IoT)/machine type communication (MTC), indus- trial use cases, vehicle to everything (V2X), multimedia broadcast multicast services (MBMS), etc. The terms XR, VR, AR and, MR may be used interchangeably. The term XR device and WTRU may be used interchangeably.

An application (e.g., a software program or group of programs that may be executed by a WTRU) may be composed of/use multiple flows (e.g., send and/or receive multiple flows). A flow (e.g., each flow) may be associated, for example, with a set of QoS criteria. In examples, a QoS for an overall application or of one or more flows may depend on the performance of one or more (e.g., other) flows. For example, satisfying or not satisfying one or more conditions for one or more flows may impact an ability of one or more other flows to meet QoS requirements. QoS adaptation may be enabled (e.g., configured or otherwise supported), for example, to ensure applications/verticals (e.g., that may be composed of multiple flows) satisfy one or more QoS requirements.

An application may be based on, for example, eXtended Reality (XR). An XR application may provide an immersive XR experience, for example, through a combination of extremely large throughput with high reliability and low latency. Delivering an XR scene at a high (e.g., the highest) quality of experience (QoE) (e.g., resolution, refresh rate) may burden the air interface capacity (e.g., to achieve the throughput (TPT), latency, reliability, etc.) and processing power (e.g. to achieve sleek form factor and low power consumption requirements). Transmissions may be adapted, for example, to relax requirements on the air interface and/or requirements on processing (e.g., without introducing perceptible degradation for a user).

Lower layer maintenance and/or adaptive WTRU behaviors may be implemented, for example, to achieve one or more QoS parameters. In examples, one or more autonomous WTRU behaviors may impact one or more QoS parameters. The impact that WTRU behavior(s) (e.g., WTRU autonomous behavior(s)) have on QoS parameters and/or (e.g., appropriate) WTRU behavior (e.g., that may be implemented) to meet QoS criteria may be assessed (e.g., and implemented, for example automatically).

QoS remapping data flows may be performed (e.g., supported). A flow or data flow may refer, for example, to an IP flow, a non-IP flow, a QoS flow, or a data flow, which may be identified by IP header fields including, for example, one or more of the following: a protocol type (e.g., a transmission control protocol (TCP), a real-time transport protocol (RTP), or a quick user datagram protocol (UDP) Internet connection (QUIC)), a resource block (RB) (e.g., a DRB or a signaling radio bearer (SRB)), and/or an LCH.

A data flow's performance may influence achievable QoS for another flow. Data flows (e.g., originating from the same application) may be configured with QoS requirements (e.g., individual or per flow QoS requirements). Data flows may be configured with one or more collective QoS requirements (e.g., based on the topline application) that may be common for all or a subset of associated flows (e.g., originating from the same application). Data flows may be configured with individual QoS requirements and collective QoS requirements. A WTRU may be configured, for example, such that a subset of flows are associated with each other. A WTRU may remap or combine a data flow to or with another associated flow, for example, if a (e.g., collective) QoS requirement is not (e.g., or may not be) met on the flow.

A WTRU may combine or remap data flows into the same QoS flow, IP flow, and/or DRB, for example, based on satisfying or triggering one or more QoS remapping conditions and/or upon transitioning between QoS states. A WTRU may be configured (e.g., via RRC signaling) with one or more data flow mapping rules (e.g., multiple data flow mapping rules). A WTRU may apply one or more mapping rules, for example, based on a current QoS state and/or upon satisfying one or more remapping conditions. RRC may configure a WTRU, for example, with a mapping between a data flow to one or more QoS flows, IP flows, and/or DRBs. A WTRU may undo a remapping or revert to a default/prior data flow mapping, for example, if the remapping triggers are cancelled and/or if another set of remapping conditions are triggered. A WTRU may track a duration of time (e.g., via a timer) upon triggering a QoS remapping condition and may revert or undo the remapping if the duration of time expires (e.g., the timer expires).

A WTRU may be configured with an association between data flows and/or a WTRU may imply an association, for example, if flows share the same application (e.g., topline application). A WTRU may be configured with an association between flows (e.g., per QoS state) and/or may apply/ activate an association, for example, based on activation of a QoS state and/or a triggering of a QoS remapping condition. A WTRU may combine data flows and/or may apply a pre-configured non-default flow remapping, for example, for a set of associated LCHs (e.g., actively associated LCHs).

A WTRU may apply a remapping function (e.g., in the SDAP layer), for example, to dynamically remap a QoS flow to a DRB, e.g., based on a current QoS state and/or based on whether associated QoS requirement(s) are met. A WTRU may combine or remap QoS flows into a DRB (e.g., the same DRB), for example, based on satisfying one or more remapping conditions and/or based on transitioning between QoS states. A WTRU may be configured (e.g., via RRC signaling) with one or more QoS flow to DRB mapping rules. A WTRU may apply one or more mapping rules, for example, based on a current QoS state and/or based on satisfying one or more remapping conditions. A WTRU may be configured (e.g., via RRC signaling), for example, with a mapping between a QoS flow to more than one DRB. A WTRU may map a QoS flow to a single DRB (e.g., at a given time). For example, RRC may configure a WTRU with a mapping of QFI1 to DRB1 and/or DRB2. The WTRU may map QFI1 to DRB1, for example, in a first QoS state and/or when remapping rules are not triggered. The WTRU may map QFI1 to DRB2, for example, in a second QoS state and/or when remapping rule(s) are triggered. A WTRU may be configured with a default mapping, which the WTRU may use, for example, if remapping conditions are not triggered or cancelled.

A WTRU indication of flow remapping may be provided. Flow remapping may occur (e.g., for uplink traffic) within a WTRU. A network may or may not be aware of a remapping (e.g., depending on the remapping trigger or depending on whether the network is aware of the WTRU's QoS state). A WTRU may provide an indication/notification to the network that the WTRU desires to or has performed a flow remapping. A WTRU may trigger a buffer status report (BSR), for example, based on performing a data flow remapping. A WTRU may trigger a scheduling request (SR), for example, based on performing a data flow remapping (e.g., on a specifically configured SR configuration). A WTRU may trigger an SR based on flow remapping, for example, if available uplink resources are not able to accommodate a BSR MAC CE conveying buffered data (e.g., newly buffered data) on a mapped logical channel group (LCG)/LCH (e.g., a newly mapped logical channel group LCG/LCH). A WTRU may cancel a BSR triggered by data flow remapping, for example, based on transmission or multiplexing a MAC protocol data unit (PDU) that contains a BSR MAC CE that reflects data remapped on a LCG/LCG (e.g., a new LCG/LCG). A WTRU may cancel an SR triggered by data flow remapping, for example, based on transmission or multiplexing a MAC PDU that includes a BSR MAC CE that reflects data remapped on the LCG/LCG (e.g., the new LCG/LCG).

A WTRU may include an indication (e.g., explicit indication) to a gNB about data flow remapping in the MAC PDU (e.g., in a MAC CE), in a packet data convergence protocol (PDCP) PDU, in a QoS flow marker, and/or in an TCP/IP flow marker. A WTRU may include (e.g., in part of a data packet) the mapped IP flow, QoS flow, and/or DRB (e.g., the newly mapped IP flow, QoS flow, and/or DRB). A WTRU may (e.g., based on remapping a QoS flow from one DRB to another) include a flow end marker (e.g., at the end of the last packet transmitted on the DRB) and/or a marker (e.g., a new marker) in a packet transmitted on the DRB (e.g., new DRB). A marker may include an indication of a mapped DRB (e.g., a newly mapped DRB).

QoS remapping triggers/conditions may be used (e.g., a WTRU may perform a QoS flow remapping if a trigger/ condition is satisfied). QoS remapping triggers/conditions may include, for example, at least one of the following: whether a QoS requirement is satisfied, an association between data flows, data arrival from an associated data flow or a QoS flow, a time since a last transmission on a flow, an amount of buffered data for a flow, a data burst volume, an amount of data transmitted, a number of data flows mapped, reception of gNB signaling, channel conditions, a number of PDCP entities, a number of MAC entities, a serving cell/ mobility, an RRC state, a connectivity state, a duration of time expiring or a start of a tracking of time (e.g., a timer expiry or start), an indication from a higher layer, and/or a QoS state transition trigger.

A QoS remapping trigger/condition may include, for example, whether a QoS requirement is satisfied. A WTRU may remap a data flow, for example, if an individual QoS flow requirement (e.g., at least one individual QoS flow requirement) is not met or if the collective QoS requirement (e.g., an application level requirement) is not met. QoS requirements may be measured, for example, in terms of latency, packet delay, packed head-of-line delay, transmission latency, reliability, number of observed retransmissions, time since last successful transmission, time since last transmission, and/or other QoS requirements.

A QoS remapping trigger/condition may include, for example, association between data flows. Flows may be configured to be associated with each other. Data flows (e.g., a subset of data flows) originating from the same application may be assumed to be associated. A WTRU may remap or combine a data flow to another associated flow, for example, if one or more collective QoS requirements are not met on the flow.

A QoS remapping trigger/condition may include, for example, data arrival from an associated data flow or a QoS flow. A WTRU may remap or combine a flow, for example, based on data arrival from an associated flow.

A QoS remapping trigger/condition may include, for example, a time since a last transmission (e.g., including survival time or data inactivity timer) on the flow. A WTRU may trigger a QoS remapping based on a condition occurring, for example, if the time since last transmission for the associated application or on the given flow is larger than a configured threshold (e.g., a configured survival time per QoS flow). A WTRU may trigger a QoS remapping based on a condition occurring, for example, based on a determination that a data inactivity time has elapsed (e.g., after the expiry of a data inactivity timer). In examples, a WTRU may track a duration of time (e.g., maintain a timer) and may reset the duration of time (e.g., via the timer), for example, if data is transmitted for the data flow. A WTRU may remap a flow, for example, based on a determination that a duration of time has elapsed (e.g., via an expiry of a timer).

A QoS remapping trigger/condition may include, for example, an amount of buffered data for a flow. A WTRU may trigger a QoS remapping based on a condition occurring, for example, if the amount of buffered data is larger or smaller than a configured threshold, or within a configured range.

A QoS remapping trigger/condition may include, for example, a data burst volume of arrived data on the data flow. A WTRU may trigger a QoS remapping based on a condition, for example, if the amount of arrived bits in a buffer is larger or smaller than a configured threshold, or within a configured range.

A QoS remapping trigger/condition may include, for example, an amount of data transmitted in the current mapped DRB/QoS flow. A WTRU may trigger a QoS remapping based on a condition occurring, for example, if the data rate (e.g., or throughput) of the flow is larger or smaller than a configured threshold or within a configured range. A WTRU may measure throughput, for example, as a mean throughput or as a throughput averaged over a moving time window. A WTRU may remap a flow, for example, if the amount of data bits transmitted is larger than a configured threshold (e.g., maximum data burst volume (MDBV)), smaller than a threshold, or within a configured range.

A QoS remapping trigger/condition may include, for example, a number of data flows that may be mapped to a DRB/QoS flow (e.g., the same DRB/QoS flow). A WTRU may trigger a QoS remapping based on a condition occurring, for example, if the WTRU maps to a DRB or QoS flow that has more than x other data flows mapped, where x may be configured, e.g., indicated by higher layers.

A QoS remapping trigger/condition may include, for example, reception of a gNB signaling. A WTRU may trigger a QoS remapping based on a condition occurring, for example, if the WTRU receives an indication to do so from the network.

A QoS remapping trigger/condition may include, for example, one or more channel conditions. A WTRU may trigger a QoS remapping based on a condition occurring, for example, if channel condition(s) (e.g., as described herein) are larger or smaller than a configured threshold or within a configured range. A WTRU may trigger a QoS remapping based on a condition occurring, for example, if a speed of the WTRU is larger or smaller than a threshold. A WTRU may trigger a QoS remapping condition, for example, if the distance from the serving cell is larger or smaller than a threshold.

A QoS remapping trigger/condition may include, for example, a number of PDCP entities. A WTRU may trigger a QoS remapping based on a condition occurring, for example, based on activation/deactivation of a PDCP entity. A WTRU may trigger a QoS remapping based on a condition occurring, for example, based on activation/deactivation of PDCP duplication on an associated DRB.

A QoS remapping trigger/condition may include, for example, a number of MAC entities. A WTRU may trigger a QoS remapping based on a condition occurring, for example, if the number of configured or active MAC entities is larger or smaller than a configured number.

A QoS remapping trigger/condition may include, for example, a serving cell/mobility. A WTRU may trigger a QoS remapping based on a condition occurring, for example, if the number of active carriers and/or number of active duplication legs is larger or smaller than a configured number. A WTRU may trigger a QoS remapping based on a condition occurring, for example, based on a handover to another cell (e.g., a successful handover to another cell).

A QoS remapping trigger/condition may include, for example, an RRC state. A WTRU may trigger a QoS remapping based on a condition occurring in a subset of RRC states, for example, in connected mode and/or for (e.g., small) data transmitted in inactive mode.

A QoS remapping trigger/condition may include, for example, a connectivity state. A WTRU may trigger a QoS remapping based on a condition occurring, for example, based on detecting a beam failure, recovering from a beam failure, and/or changing a serving beam pair or a transmission/reception point (TRP). A WTRU may trigger a QoS remapping based on a condition occurring, for example, if the discontinuous reception (DRX) state is active (e.g., in active time).

A QoS remapping trigger/condition may include, for example, a duration of time expiring or passing or a start of a tracking of time (e.g., a timer expiry or start). A WTRU may trigger a QoS remapping based on a condition occurring, for example, upon starting or expiry of a timer (e.g., a data inactivity timer, a timer related to survival time, a handover related timer such as a T304, or a power savings related timer such as a DRX inactivity timer or a DRX short cycle timer).

A QoS remapping trigger/condition may include, for example, an indication from a higher layer: A WTRU may trigger QoS remapping, for example, based on a higher layer indication (e.g., as described herein). A WTRU may trigger a QoS remapping, for example, based on detecting a change in a 5G QoS identifier (5QI) indication/marking in a higher layer PDU header at SDAP.

A QoS remapping trigger/condition may include, for example, one or more QoS state transition triggers (e.g., as described herein).

A WTRU may indicate a packet forwarding treatment for a QFI in downlink, for example, if the WTRU detects a change in QoS state. A WTRU may be configured to send an indication in the uplink, for example, to request packet forwarding treatment (e.g., if the WTRU receives the data belonging to a QFI in the downlink).

Data flows may be mapped (e.g., dynamically mapped) at a higher layer in a WTRU to different QFIs. A QFI (e.g., each QFI) may be associated with a fixed 5QI or QoS profile/state. A WTRU may send an indication to the network to indicate the QFI to be applied to the data flows, for example, if the WTRU sends data in the downlink.

Application flows may be mapped to different QFIs. A QFI (e.g., each QFI) may have a variable 5QI or QoS profile/state. A WTRU may send an indication to indicate a 5QI to be applied in downlink for the QFI, for example, if a change in 5QI is detected (e.g., at the WTRU). The WTRU may send the indication individually (e.g., each time an updated 5QI is to be applied for a QFI) or collectively (e.g., in a single indication for multiple QFIs).

A WTRU may send an indication in one or more configured DRBs, for example, if the indication contains the updated 5QI and QFI. A WTRU may send an indication in a DRB (e.g., with a corresponding QoS profile that may be equivalent to the updated 5QI), for example, if the QFI is indicated (e.g., only the QFI is indicated). The network may (e.g., in such a case) infer (e.g., implicitly infer) the updated 5QI for the QFI, for example, based on the DRB used by the WTRU to send the indication. An equivalent QoS profile may be reflectively applied. For example, a DRB (e.g., the same DRB) used by a WTRU to send an indication may be used by the network to send the data belonging to the QFI in the downlink.

A WTRU may be configured to the send a 5QI-QFI related indication, for example, based one or more of the following triggering conditions: an indication from a higher layer, an indication from an SDAP, and/or an indication from a network. A triggering condition to send a 5QI-QFI related indication may include, for example, an indication from a higher layer. In examples, higher layers in a WTRU (e.g., a NAS layer) may send a data PDU marked with a 5QI identifier/index (e.g., in a PDU header), for example, if an updated 5QI is requested in the downlink. A triggering condition to send a 5QI-QFI related indication may include, for example, an indication from an SDAP. SDAP in a WTRU may trigger an indication to be sent in the access stratum (AS) layer (e.g. UL MAC CE), for example, if an updated 5QI for a QFI (e.g. in a higher layer data PDU or control PDU) is detected. A triggering condition to send a 5QI-QFI related indication may include, for example, an indication from a network. In examples, a WTRU may receive a polling request from a network to respond with the current/updated 5QI associated with one or more QFIs. The polling request may be sent, for example, to the SDAP entity or NAS layer in the WTRU. A WTRU may send a response to a network including the 5QI-QFI indication, for example, based on identifying the updated 5QI.

LCP adaptation may be implemented. Semi-statically configured parameters (e.g., priority, PBR, BSD, LCP mapping restrictions) may limit the scheduler's flexibility, for example, in terms of meeting QoS requirements in reaction to current resource load, channel, or mobility conditions. QoS requirements of one or more LCHs may influence an achievable QoS of one or more other associated LCHs. LCHs originating from an application (e.g., the same application) may be configured with individual LCP parameters, for example, to meet QoS requirements and/or collective QoS requirements (e.g., based on the topline application) that may be common for LCHs (e.g., all LCHs or a subset of LCHs) that may originate from the application (e.g., same application). Collective requirements may be active sporadically.

A WTRU may reconfigure/adapt (e.g., dynamically reconfigure/adapt) one or more parameters that may be associated with a logical channel configuration, for example, based on one or more triggers, rules and/or criteria (e.g., predefined triggers, rules, and/or criteria). Allowable reconfigurations may be preconfigured. An allowable configuration may be specific to an LCH or groups thereof. Adapted or adaptable parameters may be relevant to (e.g., utilized in) a logical channel prioritization procedure.

A WTRU may adapt configured LCP parameters (e.g., semi-statically configured LCP parameters) for a logical channel (e.g., as a function of a current QoS state), for example, if a QoS remapping condition is triggered, if configured QoS requirements are met, and/or if collective QoS requirements are met.

An LCH may be configured with an alternate or a non-default set of LCP parameters. A WTRU may apply a non-default set of LCP parameters, for example, based on one or more of the following occurrences: transitioning into a certain configured QoS state, triggering a QoS remapping condition, receiving an LCP parameter suspension/override indication from the gNB, receiving higher layer indication, not meeting a configured individual QoS requirement associated with the DRB, and/or not meeting a collective QoS requirement associated with a topline application. A WTRU may revert to a default/prior set of configured LCP parameters for a LCH, for example, based on one or more of the following occurrences: transitioning into another QoS state (e.g., a prior QoS state), cancelling a triggered QoS remapping condition, meeting an individual or a collective QoS requirement associated with the DRB or the topline application, transmitting or multiplexing data bits from the LCH in an uplink resource, and/or meeting the configured default PBR or guaranteed bit rate (GBR) of the associated QoS flow. A WTRU may track a duration of time (e.g., start a timer), for example, based on applying non-default LCP parameters and may revert to a default set of LCP parameters based on a determination that a duration of time has elapsed (e.g., a timer expiry). A timer may be maintained (e.g., per LCH). A WTRU may track a duration of time (e.g., start a timer), for example, if the LCP parameters are changed for an LCH.

A WTRU may suspend or override one or more (e.g., a subset or all) LCP parameters (e.g., priority, PBR, BSD, LCP mapping restrictions, etc.), for example, based on a reception of an indication, e.g., from a gNB. In examples, a WTRU may suspend or override one or more LCP parameters for a configured duration of time. An indication may indicate, for example, an LCH or LCG. A WTRU may (e.g., based on reception of an indication), for example, suspend LCP parameters for the LCH/LCG, apply LCP parameters (e.g., new LCP parameters) if indicated, apply a configured set of non-default parameters, and/or apply LCP parameters for an associated LCH. An indication may explicitly indicate the LCH or LCG. A WTRU may determine (e.g., implicitly determine) the applicable LCH/LCG from a reception of an indication, for example, if the LCH/LCG is configured with a non-default set of LCP parameters. A WTRU may receive an indication in a DL MAC CE, which may include, for example, the LCH, LCG or DRB, the set of LCP parameters to be used (e.g., to override), and/or the (de-)activation status of an indicated set of LCP parameters or the default set. A WTRU may track a duration of time (e.g., start a timer), for example, based on receiving an indication. A WTRU may revert to a default set of LCP parameters, for example, based on a determination that a duration of time has elapsed (e.g., a timer expires).

A WTRU may be configured with an association between LCHs. A WTRU may imply an association between LCHs, for example, if they share the same DRB, QoS flow, IP flow, data flow, and/or topline application. A WTRU may be configured with an association between LCHs (e.g., per QoS state), and/or may apply/activate an LCH association (e.g., based on activation of a QoS state or triggering a QoS remapping condition). A WTRU may (e.g., for a set of actively associated LCHs) use a configured LCP set of parameters (e.g., a maximum or minimum LCP set of parameters) for associated LCHs (e.g., all associated LCHs). For example, a WTRU may use one or more LCP parameters (e.g., a subset of LCP parameters or all LCP parameters) for the highest or lowest priority LCH in an associated set for one or more associated LCHs (e.g., all associated LCHs). A WTRU may deactivate an association between LCHs, for example, based on transitioning into a different QoS state or cancelling a QoS remapping trigger.

State based QoS adaptation may be used. A WTRU may be configured to operate according to at least one QoS adaptation state. A QoS adaptation state may correspond, for example, to a set of parameter values for a group of data flows, radio bearers, or logical channels. A group may be referred to as a QoS adaptation group. A WTRU may (e.g., based on transition from a first state to a second state) apply (e.g., simultaneously apply) values corresponding to a second state to parameters of one or more flows, radio bearers, or logical channels (e.g., all flows, radio bearers, or logical channels) of the group. In examples, this may be done simultaneously.

A QoS adaptation state may have one or more parameters. A QoS adaptation state may include, for example, at least one of the following parameter values for a group: (i) parameters of a MAC logical channel configuration (LogicalChannelConfig) (e.g., priority, prioritized bit rate, bucket size duration, allowed subcarrier spacing, allowed serving cells, maximum PUSCH duration, allowed configured grant, etc.); (ii) parameters of an RLC configuration; (iii) parameters of a PDCP configuration for a radio bearer (e.g., whether the PDCP entity is configured with more than one RLC entity and/or whether PDCP duplication is configured); (iv) parameters of an SDAP configuration for a PDU session (e.g., a set of mapped QoS flows); and/or (v) parameters of a physical layer (PHY) configuration.

A default QoS adaptation state may be provided. A QoS adaptation state may be identified as a default state. A state (e.g., default state) may correspond (e.g., implicitly correspond) to the initial state based on configuration of a set of QoS adaptation states. A WTRU may transition to a default state, for example, if one or more certain events occur (e.g., as described herein).

FIG. 2A illustrates an example WTRU transitioning between QoS states. A WTRU may transition between states. A WTRU may transition from a first state to a second state, for example, if at least one of the following events occurs. An event may be associated with at least one parameter or threshold, which may be signaled by MAC CE or configured via RRC signaling. The at least one event and at least one associated parameter may be dependent on the first state and the second state.

An event may be metric-based. A first event may comprise, for example, a metric associated with an LCH, LCG or DRB becoming larger than a threshold (e.g., first threshold). A second event may comprise, for example, a metric associated with an LCH, LCG or DRB becoming smaller than a threshold (e.g., second threshold). The event(s) and/or the threshold(s) may be conditioned on the LCH, LCG or DRB being part of the QoS adaptation group. First and second thresholds may be configured (e.g., configured separately) for a LCH or LCH (e.g., each LCH or LCG). A WTRU may transition from a first state to a second state, for example, if the first event occurs (e.g., as shown at 2 in FIG. 2A, for example, the WTRU may change QoS states for subsequent transmissions based on a determination that a time T_1 elapses). A WTRU may transition from a second state to a first state, for example, if the second event occurs (e.g., as shown at 3 in FIG. 2A, for example, the WTRU may return to QoS state A if the WTRU receives an ACK for a transmission). The foregoing example may be generalized to more than two states.

A metric may consist of, for example, at least one of the following: data that may be available for transmission for a LCH or LCG; an amount of data that may be transmitted within a time period; a power headroom; a variable that may be used by a logical channel prioritization procedure (e.g., at least one bucket size Bj).

A metric may be determined over a time period or a window. A time period may start (e.g., as shown at 1 in FIG. 2A, for example, the WTRU may start tracking a duration of time, for example via a timer, at a first transmission), for example, based on a state transition (e.g., a transition to a new state), or if another event described herein occurs (e.g., a determination that a duration of time has expired such as an expiry of a timer). A time period may be relative to the time at which a metric is evaluated, e.g., a window of fixed duration ending at the time the metric is determined.

A event may be based on a duration of time (e.g., timer-based). An event may comprise, for example, a determination that a duration of time has expired (e.g., an expiration of a timer). A duration of time (e.g., a timer) may be associated with, for example, an RRC connection, a MAC entity, an LCH, an LCG, and/or a DRB. A duration of time (e.g., a timer) may correspond, for example, to one or more of the following: an existing timer, such as a timer that may be related to radio link monitoring (e.g., a T310), re-establishment or handover; a PDCP discard time (e.g., a PCP discard timer); a DRX inactivity time (e.g., a DRX inactivity timer); a data inactivity time (e.g., a data inactivity timer); a timing advance time (e.g., a timing advance timer); a beam failure detection time (e.g., a beam failure detection timer); and/or a bandwidth part time (e.g., a bandwidth part timer). A WTRU may transition to a default QoS adaptation state, for example, based on a determination that a duration of a time has expired (e.g., an expiry of a timer, such as a T310 timer). A duration of time (e.g., which may correspond to a new duration of time) may be tracked (e.g., via a timer), for example, if another event described herein occurs.

An event may be related to a failure detection. An event may be related to the detection of at least one instance of failure, e.g., as described below or otherwise herein. An instance of failure may include, for example, at least one of the following: (i) an SDU or PDU loss for at least one SDU or PDU (e.g., PDCP, RLC or MAC SDU, or PDU), where loss detection may occur, for example, based on a reception of a status report (e.g., at MAC, RLC, PDCP or higher layers) or based on a duration of time expiring (e.g., an expiry of a timer such as a discard timer), and where an instance of failure may occur, for example, if the SDU or PDU pertains to a QoS flow or radio bearer part of a QoS adaptation group; (ii) an SDU or PDU error for at least one SDU or PDU (e.g., a PDCP, an RLC, or an MAC SDU or PDU), where loss detection may occur, for example, based on a reception or a lack of reception of a NACK, where the instance of failure may occur if the SDU or PDU pertains to a QoS flow or radio bearer part of the QoS adaptation group or the instance of failure may occur if an SDU or PDU (e.g., one, some, or all SDUs or PDUs) in a set of associated SDUs or PDUs are in error or are lost; (iii) an occurrence of power scaling for at least one transmission; (iv) a beam failure detection or other radio link problems; (v) a random access procedure failure; and/or (vi) a maximum number of retransmissions reached for scheduling request or for an RLC PDU. An event may occur, for example, if a specific number of instances of failure occurs within a time period. A time period may be defined, for example, as described herein (e.g., above) for events based on a metric.

An event may occur if a rate of failure exceeds a threshold value. A rate of failure may be determined, e.g., by the time over which a number of instances of failures occurs. In examples, a set of n failures occurring over a time period, t_1, may lead to a failure rate greater than a threshold. A set of n failures occurring over a time period, t_2, may not lead to a failure rate greater than a threshold, e.g., if t_2 is greater than t_1 (t_2>t_1).

An event may be related to other events. An event may include a trigger (e.g., any trigger) described herein, e.g., for LCP adaptation or QoS flow remapping.

WTRU behavior based on state transition may be configured. A WTRU may perform at least one of the following actions, for example, if a state transition occurs (e.g., according to an event described herein): (i) re-establish PDCP and/or RLC entities for at least one radio bearer (e.g., a set of radio bearers of the QoS adaptation group); (ii) initiate a random access channel (RACH) procedure; (iii) restart a tracking of a duration of time (e.g., via timer(s)) related to metric-based or failure-based events; (iv) indicate to a base station (e.g., a gNB) that a state transition has occurred; and/or (v) indicate to a base station (e.g., a gNB) the reason for a state transition (e.g., why a state transition has occurred);

QoS adaptation may impact (e.g., have an effect on) MAC functionality. A WTRU may maintain multiple RRC configurations. An RRC configuration (e.g., each RRC configuration) may be assigned an index. A WTRU may (e.g., at any given moment) assume a single RRC configuration is applicable (e.g., per cell or per set of cells). An RRC configuration may include a configuration and parameters for at least one of the following functions: a secondary cell (SCell) configuration; a configured grant configuration; a time domain resource allocation (TDRA); the contents of a scheduling grant; a number of repetitions; a bandwidth part (BWP) configuration; a DRX configuration; a wake up signal configuration; a duplication configuration (e.g., PDCP duplication); a beam management configuration; a radio link monitoring configuration; a measurement reporting configuration; a CSI configuration (e.g., including a reference signal (RS) configuration and CSI reporting configuration); a conditional handover (HO) configuration; a logical channel prioritization configuration; and/or a PUCCH configuration.

A WTRU may receive an indication for an active RRC configuration for a cell or a set of cells. An indication may be received from the gNB (e.g., in a semi-static or dynamic manner). A WTRU may change (e.g., determine whether to change) an RRC configuration (e.g., implicitly), for example, based on at least one of the following: a change in QoS or a QoS state; a change in instantaneous QoS performance; and/or a change in traffic requirements.

An RRC configuration may be changed, for example, based on a change in QoS or QoS state. For example, an RRC configuration may be associated with a QoS requirement or a QoS state. A WTRU may (e.g., based on changing a QoS state) switch an active RRC configuration. A change in QoS state may be determined by the WTRU. A WTRU may indicate to the gNB that it has changed QoS state and/or an RRC configuration. A change in QoS state may be determined by the gNB. A WTRU may receive indication of a change in QoS from the gNB. In examples, an RRC configuration may be associated with a QoS mapping (e.g., as defined herein).

An RRC configuration may be changed, for example, based on a change in instantaneous QoS performance. For example, one or more QoS parameters may be measurable in a real time or instantaneous manner. A WTRU may determine an RRC configuration (e.g., new RRC configuration), for example, if one or more parameters' measurement(s) indicate(s) that a QoS requirement is not being, or will not be, met.

An RRC configuration may be changed, for example, based on a change in traffic requirements. For example, a WTRU may determine to change (e.g., determine a need to change) an RRC configuration, for example, based on a change in traffic requirements. A change in traffic requirement may be based on a change in priority, a change in data arrival rate, a change in number of flows, and/or the like.

A WTRU may be configured with an RRC configuration. A parameter (e.g., each parameter) may have multiple configurations or states (e.g., as described herein, such as listed above). A WTRU may use one or more criteria (e.g., as described herein, such as a change in QoS or QoS state, a change in instantaneous QoS performance, a change in traffic requirement, etc.), for example, to determine which configuration or state is active for a parameter (e.g., each parameter) of an RRC configuration.

There may be instantaneous QoS impacts on dynamic WTRU behavior. One or more QoS parameters may be maintained and measured, e.g., in a real time manner. An instantaneous QoS measurement may be determined as a function of current time (e.g., whether absolute time or time relative to an event), for example, if a QoS parameter is based on a unit of time. A survival time parameter may be defined. A function may be considered active until a survival time has elapsed. For example, one or more of the following functions may depend on survival time: a flow (e.g., an IP flow); a QoS parameter, QoS state, or QoS mapping; a radio bearer; a HARQ process; an application; a configured grant transmission; and/or a transmission with undefined timing (e.g., transmission with a non-numeric k value).

Instantaneous values of QoS parameters may include, for example, at least one of the following: a current error rate, a current average latency (e.g., packet latency), a current remaining survival time, or any combination thereof.

A performance (e.g., specific performance) of a QoS parameter may be maintained by a WTRU. A WTRU may modify behaviors related to one or more transmissions, for example, based on the instantaneous value of a QoS parameter. Instantaneous value(s) of a QoS may be determined, for example, by at least one of the following: (i) time (e.g., a current time or time relative to a previous event, such as a transmission, a reception, a change in QoS states, a triggering of a timer, and/or the like); (ii) success or failure of a previous transmission(s) (e.g., as determined from HARQ-ACK feedback and/or from an ability to transmit due to a successful or failed channel access mechanism); (iii) channel measurements (e.g., CSI, clear channel assessment, higher layer measurements, and/or the like); (iv) a power control value or power headroom; (v) a buffer status; and/or (vi) a traffic arrival rate.

A WTRU may select an RRC configuration or one or more parameters of an RRC configuration (e.g., as described herein), for example, based on an instantaneous performance of a QoS parameter. A WTRU may select one or more settings of a configuration. Configurations that have multiple settings may include, for example, at least one of the following: grant selection, configured grant selection, BWP selection, LBT subband selection, cross-carrier (re)transmission, SDU discarding, and/or HARQ-ACK feedback payload and/or HARQ-ACK feedback resource. A grant selection configuration may have multiple settings. For example, a WTRU may be assigned multiple grants. A WTRU may select one of multiple grants, for example, based on the instantaneous value of a QoS parameter. A selection may be for a component of a grant. In examples, a WTRU may select an MCS, a beam, a number of repetitions, a power control value, etc., for example, based on the instantaneous value of a QoS parameter. A configured grant selection configuration may have multiple settings. One or more CGs may be used (e.g., only be used) by a WTRU, for example, based on the WTRU experiencing a specific instantaneous value of a QoS parameter. A BWP selection configuration may have multiple settings. A WTRU may select a different BWP (e.g., initial BWP), for example, based on the instantaneous value of a QoS parameter. An LBT subband selection configuration may have multiple settings. A WTRU may select a different set of LBT subbands (e.g., on which to perform channel access and/or transmit), for example, based on an instantaneous value of a QoS parameter. A cross-carrier (re)transmission configuration may have multiple settings. An SDU discarding configuration may have multiple settings. A WTRU may discard (e.g., which may include making a determination to discard) SDUs, for example, based on an instantaneous value of a QoS parameter. A HARQ-ACK feedback payload and/or HARQ-ACK feedback resource configuration may have multiple settings.

A WTRU may maintain multiple real-time QoS measurement values for multiple QoS parameters. The triggering of a WTRU action (e.g., based on the instantaneous value of one or more QoS measurements) may be configurable (e.g., based on a threshold).

The triggering of a WTRU action based on the instantaneous value of one or more QoS measurement may be determined as a function of the instantaneous value itself, as a function of the instantaneous value itself in combination with another event, etc. A threshold for one or more instantaneous values of a QoS parameter may depend on, for example, a WTRU's position. A position may be absolute (e.g., in terms of coordinates) or relative to another element (e.g., another static or mobile object). A threshold for one or more instantaneous values of a QoS parameter may depend on, for example, the rate of change of a WTRU's position (e.g., speed).

There may be impacts on QoS parameters. A WTRU may be triggered to perform a task, for example, due to a condition being met (e.g., for at least one of the aforementioned RRC configuration parameters). A trigger may be tied to one or more QoS parameters, a measurement, a WTRU position, and/or an indication from a gNB. A triggered task may include, for example, at least one of the following: (i) performing a RACH procedure on the cell or another cell; (ii) changing an active BWP; (iii) transmitting a report to a cell (e.g., radio link failure (RLF), UL LBT failure, and/or the like); (iv) performing a handover (HO); (v) performing beam failure recovery (BFR); and/or (vi) changing an activity state (e.g., CONNECTED mode, IDLE mode, or INACTIVE mode).

In examples, a WTRU may have a conditional HO (CHO) configuration. The WTRU may meet the triggering criteria for the HO, for example, based on the CHO configuration. The WTRU may, (e.g., in such a case), be triggered with a specific behavior (e.g., transmit PRACH, transmit SR, and/or the like), activate an RRC configuration (e.g., a new RRC configuration), or activate a set of RRC parameters (e.g., a new set of RRC parameters). An event may have an impact on an instantaneous value of a QoS parameter. A triggered task or change in RRC configuration may be triggered (e.g., not by a change in QoS state, or QoS remapping and the like). A WTRU may (e.g., based on a triggering, for example a triggered task or triggered change in RRC configuration) perform at least one of the following: (i) change a QoS state to a different QoS state (e.g., new QoS state, configurable QoS state, or pre-determined QoS state), and, for example, a WTRU may inform a gNB of the change of QoS state; (ii) change at least one QoS parameter of one or more flows (e.g., a WTRU may inform a gNB of the change of the at least one QoS parameter of one or more flows); (iii) reset one or more instantaneous values of one or more QoS parameters (e.g., instantaneous values may be reset, for example, to an original value or to a value dependent on what triggered the change in RRC configuration); and/or (iv) inform a gNB of the instantaneous values of one or more QoS parameters.

A MAC layer may indicate QoS status. A transmission may have an associated survival time. Survival time may represent, for example, a period in which transmission may or must occur, the time in which acknowledgement of a successful transmission may or must be received (e.g., reception of HARQ ACK), or a combination thereof. A survival time may be linked to, for example, a QoS of the contents of a transmission. A survival time may indicate, for example, a time that the contents of the transmission remain valid (e.g., in association with other QoS requirements, such as latency). A survival time may be determined, for example, by the network or via one or more WTRU layers (e.g., the application layer, PDCP, RLC, MAC, or PHY layer).

Survival time maintenance may be provided. Survival time may be represented by, for example: an absolute resource, a validity time (e.g., via a timer), and/or a counter. Survival time may be represented by an absolute resource. Absolute resources may be, for example, a universal or standard time (e.g., coordinated universal time (UTC)), a resource block, slot, or frame. Survival time may be represented by a validity time (e.g., via a validity timer). A duration of time may be tracked (e.g., a timer may be started immediately), for example, if transmission contents have been generated. A tracking of a duration of time (e.g., a start of a timer) may be subject to an offset. An offset may be determined, for example, via an explicit indication, a WTRU capability, one or more QoS requirements, and/or an RRC configuration. A tracking of a duration of time may be (re)started (e.g., a timer may be (re)started), for example, after a successful transmission (e.g., every successful transmission, as shown at 1 in FIG. 2A, for example, the WTRU may restart a timer T_1 if it receives an ACK that at least one TB was received successfully) or after a transmission attempt (e.g., every transmission attempt). A WTRU may (re)start the tracking of a duration of time (e.g., via a timer), for example, based on receiving a transmission from a base station (e.g., a gNB). In examples, the WTRU may (re)start the tracking of a duration of time (e.g., via a timer) based on receiving a transmission associated with one or more of an application, a LCH, or a HARQ process for which the time (e.g., timer) is maintained. A WTRU may receive an indication from the base station to (re)start a tracking of a duration of time (e.g., via a timer). Survival time may be represented by a counter. A counter may be based on, for example, the number of other transmissions that may occur, or another metric, such as time/frequency resource blocks, slots, frames, hyperframes, etc.

A survival time (e.g., survival time timer or counter) may increase (e.g., be incremented) based on certain condition(s) (e.g., channel occupancy). A survival time (e.g., survival time timer or counter) may decrease (e.g., be decremented) based on certain condition(s) (e.g., channel occupancy). A time, such as a survival time (e.g., survival time timer or counter), may be increased or decreased if (e.g., only if) the channel is not occupied and transmissions may occur. Resources on which the channel may not be accessed (e.g., if the channel is occupied) may not be tracked in the time (e.g., counted in the timer or counter). In some examples, the time (e.g., timer or counter) may be increased or decreased based on absolute time (e.g., regardless of whether the channel is available or not).

Maintenance of a survival time may vary (e.g., may not be the same) at a layer(s) (e.g., each layer). For example, the network or an intra-WTRU layer may have a representation that may be indicated to another layer and may be maintained via another representation. A receiving layer may (e.g., based on reception of a survival time representation or QoS requirement from the network or another intra-WTRU layer) perform survival time maintenance, for example, to fulfill indicated requirement(s). Survival time may be indicated and/or maintained, for example, by an indication/ configuration (e.g., explicit indication/configuration) and/or a pre-existing configuration. Survival time may be indicated and/or maintained by an indication/configuration (e.g., explicit indication/configuration). The network or an intra-WTRU layer (e.g., another intra-WTRU layer) may provide (e.g., explicitly provide) an associated method/configuration and/or values for survival time maintenance. An indication (e.g., explicit indication) may be received/determined by a WTRU, for example, via signaling (e.g., dedicated signaling), QoS characteristics (e.g., implicit QoS characteristics), and/or status reports indicating remaining survival time. Survival time may be indicated and/or maintained by a pre-existing configuration. A WTRU may have one or more pre-exiting configurations (e.g., via RRC signaling), that may maintain survival time (e.g., indicate how to maintain survival time) at a given layer. The network and/or other intra-WTRU layer may select between one or more configurations to fulfill the indicated QoS requirements. A WTRU may select between configurations that may satisfy the requirements, for example, based on reception of survival time requirements from the network or other intra-WTRU layer(s).

In examples, the network or application may provide an absolute resource (e.g., time, slot, or frame) to a lower layer (e.g., MAC or PHY layer). An absolute resource may serve as an upper limit to a validity time (e.g., validity timer or counter) that may be maintained, for example, in MAC or PHY layers.

Burst spread maintenance may be performed or provided. A WTRU may determine that a transmission burst is about to begin. The WTRU may determine (e.g., estimate) a burst spread value. The WTRU may determine that a burst spread is about to begin, for example, based on the amount and/or type of data in a buffer (or the amount and/or type of data anticipated to be in a buffer). The burst spread value may indicate the set (e.g. expected set) of resources in UL or DL or both UL and DL the WTRU may use (e.g., require) to adequately empty a transmission buffer of the WTRU. The set of resources may include, for example, one or more of time resources, frequency resources, or spatial resources.

A WTRU may maintain a duration of time (e.g., via a timer or counter) for a burst spread (e.g., an ongoing burst spread). The tracking of a duration of time (e.g., via timer or counter) may be (re)started at the beginning of a burst spread and/or may be set to last the duration of the burst spread. The duration of time (e.g., timer or counter) may decrease (e.g., be decremented) based on time units (e.g., after every time unit). The duration of time (e.g., timer or counter) may decrease based on transmissions in the burst spread (e.g., after every transmission in the burst spread).

A survival time or burst spread indication may be provided/used. A layer (e.g., another layer) may provide an indication of survival time or burst spread status, for example, if the survival time or burst spread requirement originated from the network, or originated from a separate intra-WTRU layer. An indication may be provided or received (e.g., periodically provided or received) by a WTRU, for example, based on a configuration (e.g., RRC configuration), based on request (e.g., polling), and/or based on being triggered by an event. An event may include, for example, one or more of the following: (i) successful completion of survival time requirements (e.g., transmission of the related contents or indication of successful reception, such as an acknowledgment (ACK), within the indicated survival time parameters); (ii) the approach of survival time expiry; (iii) survival time expiry; (iv) beginning of burst spread; (v) burst spread completion; (vi) the approach of burst spread completion; and/or (vii) change in determined (e.g., estimated) burst spread value.

An indication may be provided in a dedicated manner, may contain the status of multiple pending survival times, and/or may be indicated, for example, via one or more of the following: (i) explicit signaling (e.g., a dedicated acknowledgment); (ii) implicitly (e.g., via reception of a HARQ ACK that may be addressed to the survival time packet, or via an indication to change QoS state); and/or (iii) via a status report.

In examples, the network or higher intra-WTRU layer (e.g., the application layer) may poll for the status of one or more pending survival times or burst spread values from MAC or PHY layers. MAC or PHY layers may submit a status report indicating the status of one or more (e.g., all) pending survival times or burst spread), or one or more (e.g., a subset of) survival times or burst spread that have expired or may be approaching expiry.

A WTRU may indicate the status of at least one QoS parameter associated with the WTRU (e.g., survival time, or burst spread) to a base station (e.g., a gNB). The indication may be part of a transmission (e.g., MAC CE) or may be via dedicated signaling. The indication may be periodic. The indication may be triggered. For example, the transmission of an indication by the WTRU may be triggered by at least one of: a failure (e.g., an imminent failure) associated with a QoS parameter, a change (e.g., an imminent change) of QoS adaptation state, a resetting of a value associated with a QoS parameter, or a change of a value associated with a QoS parameter. The status may include one or more of the current value of a QoS parameter, the maximum value of the QoS parameter, a change in the current value of the QoS parameter, or a change in the maximum value of the QoS parameter.

A WTRU may indicate to the base station (e.g., a gNB) that a state transition (e.g., QoS adaptation state transition) is to occur or has occurred. The WTRU may indicate the cause for a state transition. The cause may include any of the triggers as described herein (e.g., indication transmission triggers).

WTRU handling of survival time expiry may be provided. A WTRU may assess a cause of transmission failure, for example, based on a failure of a survival time or based on a trigger (e.g., by an indication from the network or another intra-WTRU layer). The network or another intra-WTRU layer may trigger an action, for example, based on a reception of a status report or indication. A cause of transmission failure may be, for example, one or more of the following: (i) poor radio link conditions (e.g., based on one or more conditions falling below a threshold); (ii) an LBT failure or a consistent LBT failure; and/or (iii) an indication of an unsuccessful reception (e.g., NACK).

A WTRU may (e.g., depending on the cause of a failure to complete transmission within a survival time), perform one or more of the following corrective actions: perform a RACH procedure; perform BWP switching; and/or perform an LBT procedure. An LBT procedure may be performed on a different subband, additional subbands, and/or with a different priority.

The network or another intra-WTRU layer may (e.g., based on reception of a status report indication that one or more survival times may be approaching expiry) request the WTRU assess the cause of the failure (e.g., radio link conditions have fallen below a threshold) and perform corrective actions (e.g., a RACH procedure).

A WTRU may determine that the survival time is about to expire and/or may switch a QoS adaptation state. The time when a WTRU may switch the QoS adaptation state may be determined based on (e.g., relative to) at least one of: a survival time duration (e.g., a maximum survival time duration), priority information (e.g., priority of one or more of an application, a transmission, a LCH, or a LCH group), a QoS adaptation state (e.g., a current QoS adaptation state), or a channel status (e.g., a channel congestion or channel measurement).

A WTRU may be configured to track a duration of time (e.g., multiple durations of time, for example via timers). If a duration of time in a first set of durations of time elapses, it may trigger a WTRU to perform one or more corrective actions or change a Qos state, an RRC configuration, or MAC function parameters. If a duration of time in a second set of durations of time elapses, it may trigger a WTRU to stop performing one or more corrective actions or change a QOS state, an RRC configuration, or MAC function parameters. Each duration of time or set of durations of time may have different triggers to start, restart, or stop.

In examples, a WTRU may be configured to track a first duration of time. The first duration of time may be started or restarted if a transmission is determined to have been successful (e.g., if a message is successfully delivered). If the first duration of time has expired (e.g., passed), the WTRU may perform a first corrective action and may start tracking a second duration of time (e.g., start a second timer). The first corrective action may be as described herein or may include a QoS adaption, an RRC adaptation, or a MAC function adaptation. If the second duration of time has expired, the WTRU may determine that a survival time has expired and may perform a second corrective action (e.g., one of the corrective actions described herein). If the second duration of time is still running (e.g., a timer associated with the second duration of time is still running), the WTRU may stop tracking the second duration of time and start tracking the first duration of time (e.g., start a timer associated with the first duration of time), for example if at least one of the following occurs: the WTRU successfully transmits n transmissions or messages if the second duration of time is running, the WTRU receives confirmation that one or more transmission(s) that occurred prior to starting the second duration of time has been successfully transmitted, or there is reception of an indication (e.g., the WTRU may receive an indication from the gNB that instructs the WTRU to stop tracking the second duration of time and start tracking the first duration of time).

In examples, if the second duration of time is being tracked, the WTRU may stop tracking the second duration of time and start tracking the first, e.g., if the WTRU receives confirmation that one or more transmission(s) that occurred prior to starting the tracking of the second duration of time has been successfully transmitted. In examples, the WTRU may perform a transmission if the first duration of time is being tracked and the WTRU may not receive feedback. The first duration of time may expire and may be restarted if (e.g., only if) the transmission has been determined to have been successful. If the WTRU receives feedback that the transmission for which it had not received feedback has been successfully transmitted while the second duration of time is being tracked, the WTRU may stop tracking the second duration of time and start tracking the first duration of time (e.g., start a timer associated with the first duration of time).

If the WTRU starts tracking the first duration of time (e.g., as described above), the WTRU may perform a QoS state adaptation, an RRC configuration adaptation, or a MAC function adaption. In examples, a WTRU may operate using a first RRC configuration while a first duration of time is running. If the first duration of time expires, the WTRU may adapt its RRC configuration e.g., to one that is more robust. If a trigger to stop tracking a second duration of time and start tracking a first duration of time occurs, the WTRU may adapt its RRC configuration to the first RRC configuration. Multiple adaptation steps may be used, e.g., where each adaptation step may be associated with a duration of time (e.g., a respective timer) or with a metric (e.g., respective metric) as described herein. The multiple adaptation steps may enable different levels of robustness or reliability.

In examples, if a second duration of time is running (e.g., a timer associated with the second duration of time is running), the WTRU may stop tracking the second duration of time and start tracking the first or second duration of time (e.g., start a timer associated with the first duration of time or a timer associated with the second duration of time) if n successful transmissions have occurred. The WTRU may perform a QoS state adaptation, an RRC configuration adaptation, or a MAC function adaptation if m successful transmissions have occurred (e.g., as shown at 3 in FIG. 2A, for example, the WTRU may return to QoS state A if the WTRU receives an ACK for at least one transmission), where m may be greater than n. A WTRU may determine whether to perform a QoS adaptation, an RRC configuration, or a MAC function adaptation if the WTRU starts tracking the second duration of time (e.g., if the WTRU starts a timer associated with the second duration of time), where the determination may be a function of the QoS state, RRC configuration, or MAC function the WTRU is using when the WTRU is triggered to track the second duration of time.

Figure 2B:
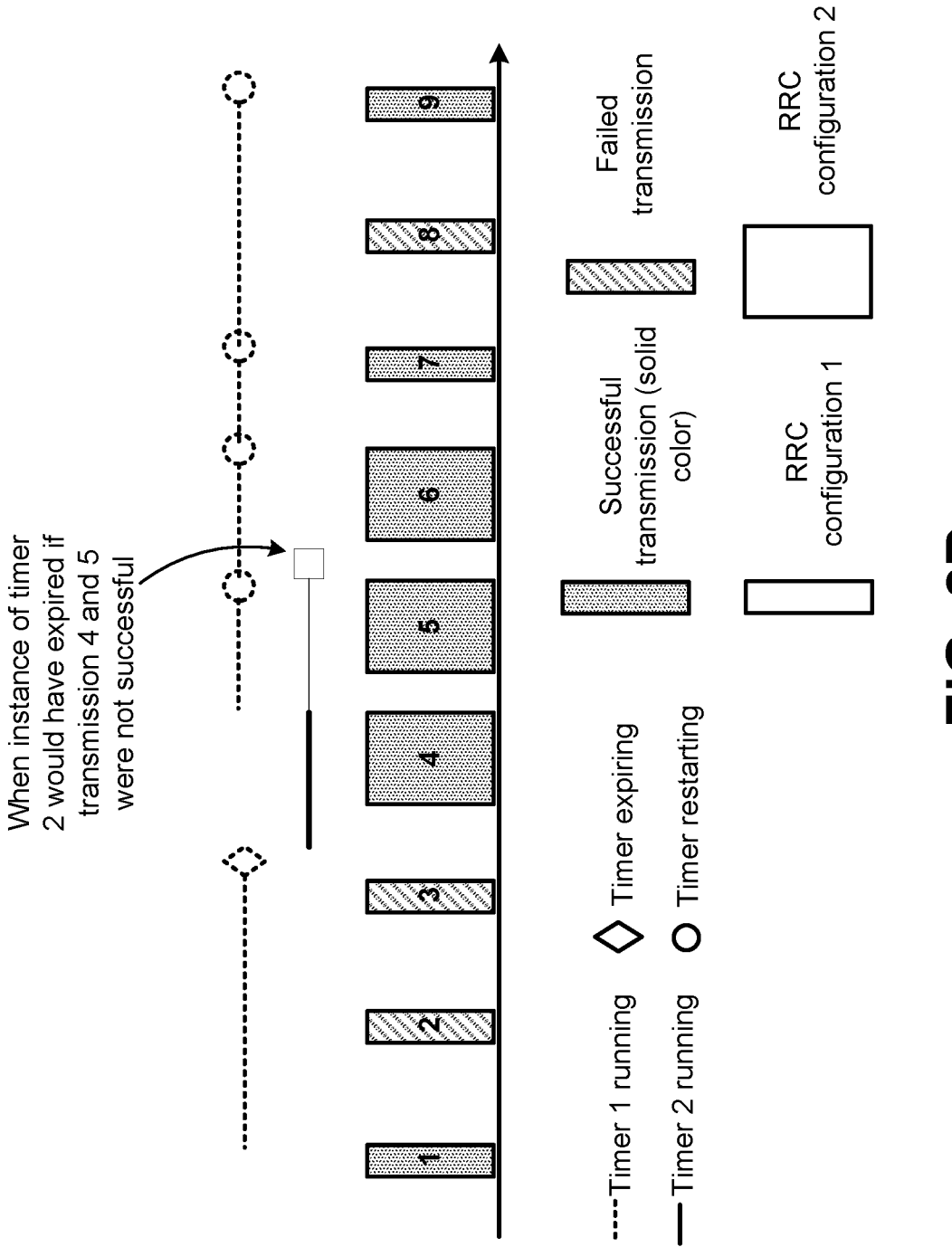
FIG. 2B is a diagram illustrating an example RRC configuration adaptation using timers.

FIG. 2B shows an example of RRC configuration adaptation using durations of time (e.g., using timers, which are illustrated as examples of tracking the durations of time in FIG. 2B). As illustrated on the left in FIG. 2B, the WTRU restarts timer 1 after successful transmission 1. If transmission 2 and transmission 3 are not successful, timer 1 may expire. The WTRU may start timer 2 and adapt to an RRC configuration 2 (e.g., where RRC configuration 2 may be more robust than RRC configuration 1) for subsequent transmissions. As illustrated by FIG. 2B, if one transmission is successful (e.g., transmission 4), the WTRU may stop timer 2 and start timer 1. The WTRU may remain in RRC configuration 2 (e.g., more robust RRC configuration). The WTRU may restart timer 1 after a successful transmission (e.g., after transmission 5 and after transmission 6). After a number of successful transmissions (e.g., m=3) in RRC configuration 2 (e.g., the more robust RRC configuration), the WTRU may restart timer 1 and adapt to the original RRC configuration 1. A WTRU restarting timer 1 and adapting to the original RRC configuration 1 may ensure that the WTRU does not remain in a resource intensive RRC configuration 2 (e.g., more robust RRC configuration) indefinitely. As shown in FIG. 2B, a transmission may fail (e.g., transmission 8), but if a transmission (e.g., transmission 9) succeeds before timer 1 expires, RRC adaptation may not be performed. In examples, if transmissions fail and a timer expires, the WTRU may take corrective actions as described herein. If transmission 4 is successful and timer 2 stops and timer 1 is started, later transmissions 5 and transmission 6 may have failed, and timer 1 may have expired, which may require a WTRU to start timer 2. If a WTRU is already in a robust RRC configuration 2, an RRC configuration adaptation may not occur.

A WTRU may perform one or more of the following in association with handling a burst spread. A WTRU may receive an indication that a burst spread has begun. The WTRU may change a QoS adaptation state, for example, upon reception of the burst spread indication. The WTRU may start tracking a duration of time (e.g., via a timer). The value of the duration of time (e.g., timer) may be determined, for example, as a function of the burst spread value. The WTRU may go to a certain QoS adaptation state, for example, based on expiration of the duration of time (e.g., via a timer). In examples, the WTRU may return to an original QoS adaptation state based on expiration of the duration of time (e.g., via a timer). The WTRU may receive an indication to perform one of more of the following: (re)start, reset, pause, or stop the burst spread duration of time (e.g., via a timer). The WTRU may start a burst spread (e.g., determine that it is beginning a burst spread). The WTRU may change a QoS adaptation state, for example, based on starting a burst spread. The WTRU may indicate to the base station (e.g., a gNB) that the WTRU has started or is starting a burst spread. The WTRU may indicate the value of the burst spread to the base station. The WTRU may provide updates (e.g., on the status of the burst spread) to the base station. The WTRU may be triggered to provide updates of the burst spread, for example, if the value of the burst spread has changed. The WTRU may determine that a burst spread has ended, for example, based on one or more of: a reception of a signal from the base station (e.g., a gNB), a buffer status, or a duration of time expiring (e.g., a timer expiring). The WTRU may change a QoS adaptation state, for example, based a burst spread ending. The WTRU may indicate to the base station (e.g., a gNB) that the burst spread has ended.

MAC procedures may affect survival time. Survival time may be affected, for example, by one or more of the following, which may interrupt normal transmission: beam failure recovery (BFR); radio link failure (RLF); bandwidth part (BWP) switching; and/or LBT failure. An occurrence of BFR, RLF, BWP switching, and/or LBT failure may not affect ongoing survival time(s) (e.g., survival timer(s)), or may not require further indication, for example, if the WTRU is capable of fulfilling survival time requirements, or if an occurrence of BFR, RLF, BWP switching, and/or LBT failure were triggered by the network or intra-WTRU layer (e.g., in response to an update or status of pending survival times).

In examples, a WTRU may perform one or more of the following actions (e.g., based on an occurrence of one or more procedures that may impact normal transmission): (i) suspend one or more survival times (e.g., survival timers), for example, until normal transmission may resume; (ii) declare failure of one or more pending survival times (e.g., survival timers); and/or (iii) indicate a survival time interruption (e.g., including providing the cause of interruption) to the network or another intra-WTRU layer.

Sensor based QoS adaptation may be provided. A difference between legacy video streaming (e.g., 2D video streaming) and VR streaming may be the characteristic of a viewport. A user may be exposed to a complete video, for example, while watching a legacy video stream. A user may be exposed to a portion of a video (e.g., only a portion of a video), for example, for VR streaming. For example, a user may be exposed to the part of a video within the user's field of view. A quality of experience (QoE) of a video portion within a user's viewport may be different than a video portion outside the user's viewport. Foveated rendering is a rendering technique that may use an eye tracker integrated with a virtual reality headset, for example, to reduce the rendering workload (e.g., by reducing the image quality in a user's peripheral vision). Using a user's perception characteristics, an XR scene may be divided into different quadrants (or variants thereof), where the quality of image/video (e.g., resolution, refresh rate) may be different between at least two quadrants. Data for an XR scene may be structured into different streams/flows with differentiated QoS requirements. The QoS requirements associated with different quadrants/streams/flows may be adapted (e.g., dynamically adapted), for example, as a function of sensor data (e.g., for eye tracking). A selective QoS may be employed, for example, to reduce an air interface burden. For example, a quadrant/stream/flow with user focus may be transmitted with a highest QoS while quadrant/stream/flow adjacent to and/or not in user focus may be transmitted with relaxed QoS requirements.

QoS adaptation may be triggered, for example, based on one or more of the following: sensor data, which may be processed or unprocessed, an input, an output to a XR device, interaction with accessories, interaction with other XR devices, interaction with IoT devices, a change of state from one or more of the users, the external environment, and/or transmission contents (e.g., media content that may be associated with an XR service).

Differentiated QoS (e.g., based on sensor data) may be enabled, for example, by enabling and/or performing adaptive transmissions. Sensor data may include, for example, one or more of the following: vision based sensor data, movement based sensor data, location based sensor data, sound based sensor data, haptic/touch based sensor data, environmental sensor data, and/or health based sensor data. Vision based sensor data may be generated, for example, via eye tracking, focus of vision, pupil sensing (e.g., dilation/constriction), gaze estimation, detection whether an eye is closed (e.g., blinking indication), etc. Movement based sensor data may be generated, for example, via an accelerometer (e.g., located in a headset), hand tracking, body tracking, step tracking, detection of movement in the external environment, etc. Location based sensor data may be generated, for example, via network positioning methods, GPS, proximity, depth, distance sensing, etc. Sound based sensor data may be generated, for example, by detecting sounds originating from a user (e.g., speech detection, clapping, snapping), detection of sounds from the external environment (e.g., a car horn), etc. Haptic/touch based sensor data may be generated, for example, based on touch detection, contact with an object from the external environment, etc. Environmental sensor data may be generated, for example, via temperature sensors, humidity sensors, barometric pressure sensors, detection of chemicals (e.g., pollution, carbon monoxide), etc. Health based sensor data may be generated, for example, by tracking one or more vital functions of a user, such as blood pressure, heartbeat, blood glucose level, breathing rate, blood oxygen level, etc.

The term sensor data may include one or more predictive metrics (e.g., any or all predictive metrics) made on, for example, natural language and/or image/video analysis.

In examples, triggers based on sensor data may be modeled, for example, as a generic higher layer indication delivered to the lower layers for QoS adaptation. A higher layer may correspond, for example, to a non-access stratum (NAS) layer, an application layer, or a codec. A higher layer may collect and/or compute metrics that may be associated with a quality of experience (QoE) for a user. In examples, one or more lower layers may be configured (e.g., based on receiving a higher layer indication), for example, to perform one or more of the following: a QoS remapping, an LCP adaptation, and/or a QoS state adaptation (e.g., and subsequent actions that may be triggered based on such adaptation).

A higher layer indication may originate, for example, from a WTRU, an XR device, a network and/or an input (e.g., additional input) that may affect XR content, such as an external sensor, an accessory, and/or an IOT device. Indications may be transmitted, for example, periodically, based on dynamic triggers, and/or based on request (e.g., as a request/response procedure).

Implementations(s) and/or feature(s) herein may be described in terms of behaviors (e.g., actions) of a WTRU. In examples, the behaviors may be performed by an entity such as a NW node or other devices, which may not include WTRU functionality(ies). In some examples (e.g., certain use cases or certain time instances), the entity or other devices may behave like a WTRU. The one or more examples herein may be equally applicable to the entity or other devices. The examples for the entity or other devices may include, but not limited to, certain network infrastructure equipment, access point, certain sensors, and certain set-top boxes.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless/transmit receive unit (WTRU) comprising: a processor configured to:

receive configuration information, wherein the configuration information indicates a first configured quality of service (QoS) state associated with a data radio bearer (DRB), a second configured QoS state associated with the DRB, and a period of time associated with transitioning from the first configured QoS state to the second configured QoS state for the DRB;

perform a first data transmission, the first data transmission comprising data of the DRB, wherein the first data transmission is performed using transmission settings associated with the first configured QoS state;

determine that the period of time has elapsed since transmission of the first data transmission and that an acknowledgement of the first data transmission has not been received;

perform a second data transmission, the second data transmission comprising data of the DRB, wherein the second data transmission is performed using transmission settings associated with the second configured QoS state based on determining that the period of time has elapsed since transmission of the first data transmission and that an acknowledgement of the first data transmission has not been received; and return to the first configured QoS state from the second configured QoS state based on receiving the acknowledgement.

2. The WTRU of claim 1, wherein the first configured QoS state is associated with a first Packet Data Convergence Protocol (PDCP) configuration, and the second configured QoS state is associated with a second PDCP configuration.

3. The WTRU of claim 2, wherein a PDCP duplication is disabled in the first PDCP configuration and PDCP duplication is enabled in the second PDCP configuration.

4. The WTRU of claim 1, wherein the first configured QoS state is associated with a first service data adaptation layer (SDAP) configuration, and the second configured QoS state is associated with a second SDAP configuration.

5. The WTRU of claim 1, wherein the first configured QoS state is associated with a first set of one or more logical channel prioritization (LCP) parameters for the DRB and the second configured QoS state is associated with a second set of one or more LCP parameters for the DRB.

6. The WTRU of claim 1, wherein the first configured QoS state is associated with a first radio link control (RLC) configuration, and the second configured QoS state is associated with a second RLC configuration.

7. The WTRU of claim 1, wherein the processor is configured to:
   determine to switch from the first configured QOS state to the second configured QoS state; and
   switch from the first configured QoS state to the second configured QoS state.

8. A method implemented by a wireless/transmit receive unit (WTRU), the method comprising:
   receiving configuration information, wherein the configuration information indicates a first configured quality of service (QoS) state associated with a data radio bearer (DRB), a second configured QoS state associated with the DRB, and a period of time associated with transitioning from the first configured QoS state to the second configured QoS state for the DRB;
   performing a first data transmission, the first data transmission comprising data of the DRB, wherein the first data transmission is performed using transmission settings associated with the first configured QoS state;
   determining that the period of time has elapsed since transmission of the first data transmission and that an acknowledgement of the first data transmission has not been received;
   performing a second data transmission, the second data transmission comprising data of the DRB, wherein the second data transmission is performed using transmission settings associated with the second QoS state based on determining that the period of time has elapsed since transmission of the first data transmission and that an acknowledgement of the first data transmission has not been received; and
   returning to the first configured QoS state from the second configured QoS state based on receiving the acknowledgment.

9. The method of claim 8, wherein the configuration information is received in a radio resource control (RRC) message.

10. The method of claim 8, further comprising the first configured QoS state associates the DRB with a first medium access control (MAC) logical channel (LCH), and the second configured QoS state associates the DRB with a second MAC LCH.

11. The method of claim 8, further comprising:
    determining to switch from the first configured QoS state to the second configured QoS state; and
    switching from the first configured QoS state to the second configured QoS state.

12. The method of claim 8, wherein the first configured QoS state is associated with a first radio link monitoring configuration and the second configured QoS state is associated with a second RLM configuration.

13. The method of claim 8, wherein the first configured QoS state associated the DRB with a first logical channel priority and a first set of one or more logical channel prioritization (LCP) restrictions and the second configured QoS state associates the DRB with a second logical channel priority and a second set of one or more LCP restrictions.

14. The method of claim 8, further comprising sending an indication associated with the second configured QoS state to a base station upon transitioning to the second QoS state.

15. A network device comprising processor and memory, the processor and memory configured to:
    send configuration information to a wireless transmit/ receive unit (WTRU), wherein the configuration information indicates a first configured quality of service (QoS) state associated with a data radio bearer (DRB), a second configured QoS state associated with the DRB, and a period of time associated with the WTRU transitioning from the first configured QoS state to the second configured QoS state for the DRB;
    receive a first data transmission, the first data transmission comprising data of the DRB, wherein the first data transmission is associated with transmission settings corresponding to the first configured QoS state; and
    receive a second data transmission, the second data transmission comprising data of the DRB, wherein the second data transmission is associated with transmission settings corresponding to the second configured QoS state, wherein the second data transmission is received after the period of period has elapsed since reception of the first data transmission without transmission of an acknowledgement of the first data transmission to the WTRU.

* * * * *